United States Patent [19]

Andreetti

[11] Patent Number: 4,932,154
[45] Date of Patent: Jun. 12, 1990

[54] FISHING RIG METHOD AND APPARATUS

[76] Inventor: Robert Andreetti, 25415 SW. 128th Ave., Miami, Fla. 33032

[21] Appl. No.: 408,898

[22] Filed: Sep. 18, 1989

[51] Int. Cl.⁵ .............................................. A01K 83/06
[52] U.S. Cl. ...................................................... 43/44.6
[58] Field of Search ...................... 43/44.4, 44.6, 44.8, 43/42.39

[56] References Cited

U.S. PATENT DOCUMENTS

| | | | |
|---|---|---|---|
| 2,782,550 | 2/1957 | Bretl | 43/44.4 |
| 2,795,885 | 6/1957 | Imberti | 43/44.4 |
| 2,939,241 | 6/1960 | Hicks | 43/43.6 |
| 3,760,529 | 9/1973 | Hicks | 43/44.4 |
| 3,893,255 | 7/1975 | Hicks | 43/44.4 |
| 4,848,023 | 7/1989 | Ryder et al. | 43/44.6 |

Primary Examiner—M. Jordan
Attorney, Agent, or Firm—Robert J. Van Der Wall

[57] ABSTRACT

The present invention provides a very carefully designed trolling rig and a method of combining the trolling rig with bait that is especially intended for use with a certain bait fish that is commonly known as a ballyhoo. The ballyhoos that are usually sold for bait are quite uniform in size and, therefore, can be used with the present invention. Thr present invention provides a conical cap that is made, preferably by molding, to resemble the head of a ballyhoo and which has a hollow cavity of a size and shape that will be compatible with the size and shape of the head of a bait ballyhoo. This conical cap, which is preferably molded or cast from a dense material, is closed at the front with a leader being attached unobtrusively to the leading edge of the cap. Another leader is unobtrusively attached to the rear lower edge of the conical cap, and a hook is connected to the other end of this rear leader. An angled and vertically positioned locking pin is used for holding the fish in the conical cap.

11 Claims, 1 Drawing Sheet

FISHING RIG METHOD AND APPARATUS

FIELD OF THE INVENTION

The present invention relates to the field of fishing tackle in general and more particularly concerns a rig that combines with bait to resemble a specific bait fish that attracts larger predatory game fish and the method of its use.

BACKGROUND OF THE INVENTION

As most all avid sport fishermen know, the science and art of attracting fish and catching them is embroidered with innumerable imaginative gadgets and strategies, the efficacy of which is often the subject of unsubstantiated hyperbole. Frequently, part of the entertainment of the sport involves individualistic evaluation of the assertions of fellow aficionados.

The seemingly endless proliferation of lures and rigs of many forms and the employing of many techniques continue to be legion, and probably will always be, but such is the nature of those who pursue the usually invisible fish in its natural environment.

There is, of course, certain well established facts that are cornerstones of the fishing avocation. Among the most prominent is the fact that many varieties of fish are predators and feed on smaller fish. Therefore, we can quickly recognize that predator fish can be attracted by imitating the type of smaller fish upon which the predators feed.

The present invention provides a very carefully designed trolling rig and a method of combining same with bait that is especially intended for use with a certain bait fish that is commonly known as a ballyhoo. The ballyhoos that are usually sold for bait are quite uniform in size and, therefore, can be used with the present invention. The present invention provides a conical cap that is made, preferably by molding, to resemble the head of a ballyhoo and which has a hollow cavity of a size and shape that will be compatible with the size and shape of the head of a bait ballyhoo. This conical cap, which is preferably molded or cast from a dense material, is closed at the front with a leader being attached unobtrusively to the leading edge of the cap. Another leader is unobtrusively attached to the rear lower edge of the conical cap, and a hook is connected to the other end of this rear leader.

The dense material is preferred, although not essential, because it is thus heavier than the water in which the rig and bait are immersed and towed for trolling purposes. The dense material therefore acts as a weight. The intent is to resemble a bait fish swimming in its natural environment, and that is not at the surface of the water. It is, of course, well established that an unweighted lure that is towed by a surface vessel will rise to the surface, or same level as the vessel, if it is neutrally buoyant. Thus, use of a dense material for molding the conical cap minimizes or eliminates the need to use a separate weight, making the structure more realistic to the predatory game fish sought to be attracted. The dense material is preferably lead.

As noted above, a forward leader is attached to the front of the conical cap, and the front end of the forward leader has an eye or swivel attached thereto so that the leader may be attached to a fishing line in the conventional manner. The method aspects of the invention distinguish sharply over many prior art devices. To use the invention, a bait fish such as a ballyhoo is selected. The pointed bill of the ballyhoo, if ballyhoo is used, is broken off by the user, the head of the bait ballyhoo is inserted into the cavity of the conical cap and a locking pin is inserted vertically through the opening in the top of the cap. The locking pin which cannot be removed from the rig, passes through the head of the bait fish at an angle, the pin angle being directed toward the front of the cap, and the bait fish is thus locked securely in the conical cap. A fish hook that is attached to the rear end of the rear leader is imbedded in the body of the bait fish so it is hidden from view. When the present invention is so assembled, a very smooth and symmetrical bait form is created and the rig will pass through the water in a natural manner, without unnatural gyrational movement, and will serve to better attract predatory game fish. The leader projecting from the leading edge of the front cap replaces in appearance the bill of the ballyhoo that has been broken off to use the rig, thus preserving the natural appearance of the bait fish.

Although there has been much activity in this field for many years, a recent search of the prior art of record indicates that the present invention is novel in concept and construction.

U.S. Pat. No. 3,645,031 by Egles et al. teaches a device that, while generally similar to the present invention, is specifically different in a number of ways. Egles et al. teaches an apparently lightweight cap, open at the front end and appears to be of sheet metal construction. The open front end unlike the present invention can allow water to enter the mouth of the bait fish, causing the same to become bloated when being towed through the water. The fishing line or a leader is visibly attached to the cap at the front, thus destroying the natural resemblance of this rig to a bait fish in its active environment. The disclosure of Eoles et al. also differs from the natural appearance of the bait fish by reason of the externally visible locking pin 25, the ends of which are apparent on both sides of the bait fish when the rig and bait fish are locked together. Moreover, the horizontal direction with which the locking pin 25 is deployed require insertion through the eyes of the bait fish, requiring insertion of the head of the bait fish in precisely the correct orientation and to the precise depth to align the eyes with holes 22 or 23 as described by the Egles et al. specification. This contrasts sharply with the present invention or depth of bait fish insertion judgment or skill.

U.S. Pat. No. 4,133,132 by Ellis et al. teaches a blunt cap having two holes in the front face. The rig is designed to oscillate during trolling. The action may be varied by passing the leader through one hole or the other. The present invention, by contrast, is purposely streamlined to avoid oscillation and the leader always remains in the center and is not removable. Most importantly, the Ellis et al. device does not make any significant effort to resemble a bait fish in its natural environment and assumes the predatory game fish has inadequate vision to detect that the herring bait fish has no head. The herring is supposed to appear wounded, of course, and it is curious how any fish "wounded" by the loss of its head could swim at all. Ellis et al. is clearly a lightweight device.

U.S. Pat. No. 3,415,004 by Whalen teaches a structure very much unlike the present invention, being open at both ends and having attaching means that are not positioned with the center line or axis of the bait. Most obviously, the device of Whalen makes no effort to appear as a bait fish in a natural environment, the bait being circumscribed by a highly unnatural harness, being accompanied on its swim with a plurality of unappetizing hooks and enough attaching hardware to look like spaghetti. See, for example, FIG. 2 of the disclosure. The device of Whalen appears to be fabricated from sheet metal and wire, is apparently lightweight and makes no assertion regarding material density or a weight function.

U.S. Pat. No. 2,763,086 by Johnson et al. teaches a head or head piece that has an open slot at the top for insertion of a portion of a leader wire, the leader wire passing freely through the cap and having a hook attached to the rearward end. It does not teach the features of the present invention, which lack an open slot at the top. Johnson et al. also teaches apertures 20 which must be registered with the eyes of the bait fish in the disadvantageous manner described for the Egles et al. reference distinguished above. Numerous aspects of the Johnson et al. device damage any effort to make it appear to resemble a bait fish in its natural environment. Examples are the longitudinal slot 16 angled locking notches 18, projecting locking pin 21 (see FIG. 6), projecting end portion 11 of the leader also used as a locking pin (see FIG. 5), rubber band 22 (see FIG. 6), etc. The manner of locking the bait fish to rig also differs significantly in the way the Egles et al. does, plus the use of projecting end portion 11 of the leader as such a device. Johnson et al. includes a head or head piece 12 which is flexible, being preferably formed of plastic, and is specifically recited to be lightweight, eschewing any assertion of dense material that would constitute a weight. However, the most striking distinction of Johnson et al. with the present invention is the large number of steps that are recited in using the device disclosed, as opposed to the form required for the method of present invention. These numerous steps are necessitated by the structure of the Johnson et al. device, and some ten are indicated in Column 2, line 69, to Column 3, line 37. The present invention is designed to be easily used, only four easy steps, hereinafter described, being used, greatly speeding up the baiting process to maximize fishing time, and requiring no manual dexterity or skill.

U.S. Pat. No. 4,067,135 by Martin discloses a bait holding device for holding live, dead and artificial bait. Martin teaches a cap with a closed front but, unlike the present invention, it has a diving vane at the front that is supposed to cause the rig to run deeper in the water, and includes an eyelet mounted on the vane for attachment of a leader or a fishing line. A rearward treble hook is attached to the rear of the cap at the open end by separate means. The Martin reference also differs from the present invention by significant variations in appearance from natural bait fish. These variations include the treble hook that cannot be embedded in the bait fish body and the diving vane which, especially when viewed from above or below, (see FIG. 2 and 3) destroys the appearance of a natural bait fish. Furthermore, although the diving vane, described as isosceles triangular number 28, is intended by Martin to control the trolling depth of his rig, mere observation indicates that it represents an addition to the remaining rig structure that is dynamically unstable and would result in the rig spinning or otherwise acting in an unnatural manner for a bait fish.

As set forth in the foregoing comparisons, it may be concluded that the structure of present invention presents a novel and useful departure from the structure of the prior art. Furthermore, it presents a structure intended to be fast and easy to use by persons having no particular fishing or manual dexterity skills. There is thus presented an inventive method of use comprising only four quick steps when ballyhoo is the bait fish, and only three when it is not. They are: (1) breaking the bill off of a ballyhoo, (2) inserting the head of the ballyhoo all the way into the conical cap, (3) pushing the locking pin all the way into the body of the ballyhoo to hold it securely in the conical front cap, and (4) embedding the hook into the body of the ballyhoo.

Although but a few of the novel features of the present invention have been described, the novelty and usefulness of the invention will become more apparent after a reading to the summary and detailed descriptions that follow.

SUMMARY OF THE INVENTION

A principal object of the present invention is to provide a simple and efficient means and method to hold a bait fish for trolling.

An additional object of the present invention is to provide a bait holder that will imitate the actions of a live fish swimming in its natural environment in a realistic manner.

Another object of the present invention is to provide a bait holding rig that will be more economical to manufacture.

One more object of the present invention is to optionally include weight means with the rig to hold the rig below the water surface, and to do so without appearance destroying external weights by molding the weight directly into the rig itself.

A further object of the present invention is to provide the plain closed end cap to prevent undesirable internal water flow that might exert an unfavorable effect to the performance of the lo rig, or will allow water to enter into the mouth of the bait fish so it can become bloated.

A still further object of the present invention is to provide the angled and vertical locking pin for holding the bait fish securely within the conical cap, which locking pin is designed with flattened point end so it cannot be removed from the rig, preventing its loss.

The invention will be better understood after reading the following detailed description of the embodiments thereof with reference to the appended drawings, in which:

DETAILED DESCRIPTION OF PREFERRED EMBODIMENT

Figure 1:
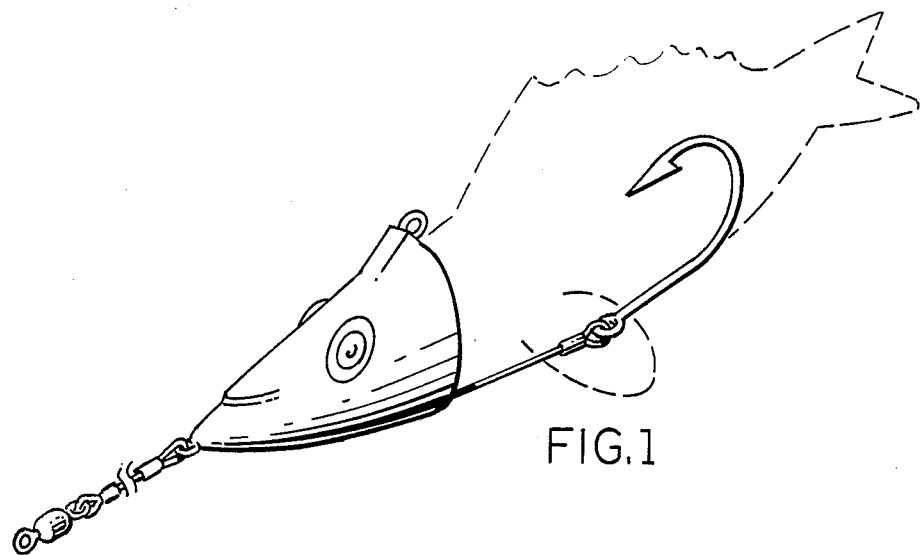
FIG. 1 is a perspective view showing the invention with a bait fish therein in phantom.

FIG. 1 presents a perspective view of the invention 10. The conical cap 12 is shaped is provided with an open cavity 22 (see FIG. 3) to receive and hold the head of a bait fish 16 (shown in phantom). The locking pin 14 is inserted through the passage 26 in the upper part of the conical cap 12, the pin 14 passing through the head of the bait fish 16, locking the bait fish 16 securely within the open cavity 22 of the conical cap 12. A forward wire leader 18 attaches to a forward eyelet 28 and extends further forward to be fastened to a fishing line, in a conventional manner. Another wire leader, a rear leader 30, attaches to a rear eyelet 32 at the lower rear edge of the conical cap 12. Fish hook 20 is attached to the trailing end of rear leader 30, and is embedded for disguise into a bait fish 16.

Figure 2:
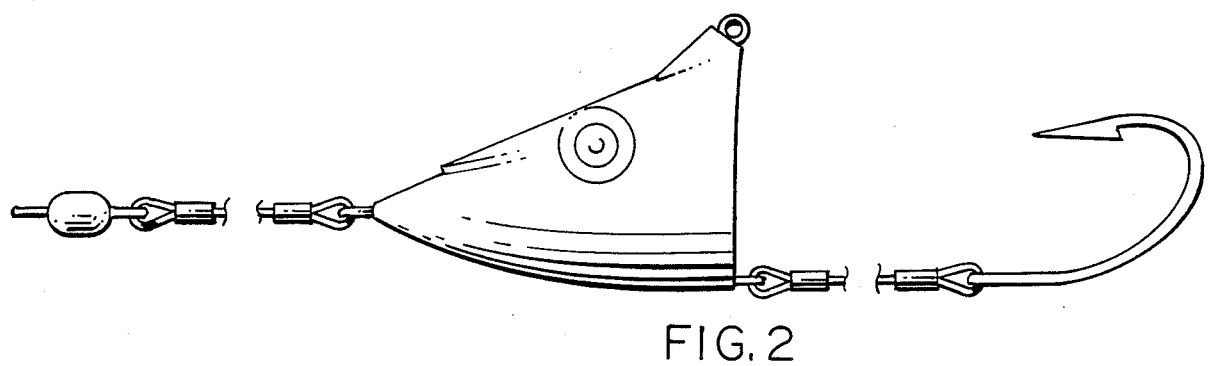
FIG. 2 is a side elevation view of the invention.

FIG. 2 is a side elevation view of the conical cap 12 with the forward leader 18 attached at forward eyelet 28. Rear leader 30 is attached to rear eyelet 32, and holds fish hook 20. The eye 24 and the locking pin 14 are also shown.

Figure 3:
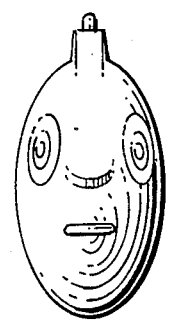
FIG. 3 is a cross-sectional view of an the invention.

Turning now to FIG. 3, a side cross sectional view is presented showing the open cavity 22 of conical cap 12 to receive the head of a bait fish 16 (FIG. 1). Also seen is the locking pin 14 angled forwardly as a barb to securely hold the head of the bait fish 16 within the cavity 22 of the cap 12. The locking pin 14 preferably has a flattened point 34 to prevent the locking pin 14 from being completely withdrawn through passage 26 to assure it will not be lost.

Figure 4:
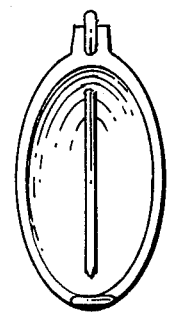
FIG. 4 is a front elevation view of the invention.

FIG. 4 is a front elevation view showing the conical cap 12 with the forward eyelet 28, attached to the apex of said conical cap, the eyes 24 and the locking pin 14.

Figure 5:
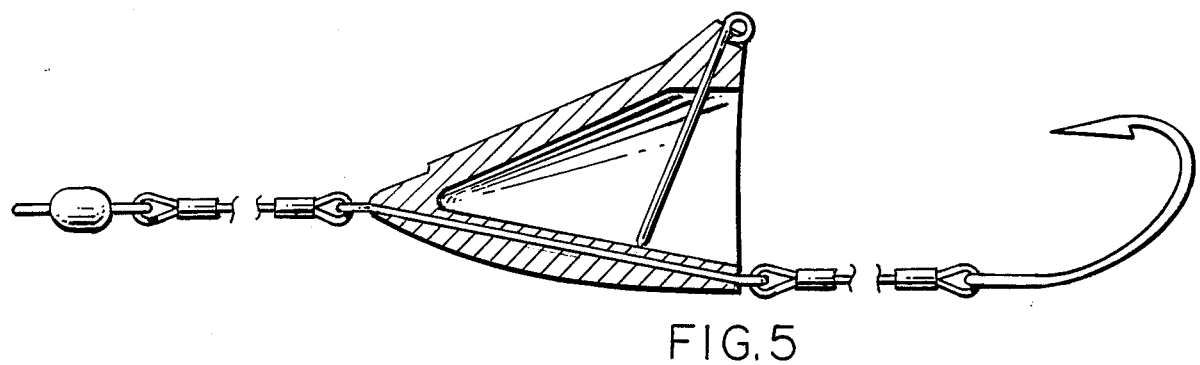
FIG. 5 is a rear elevation of the invention.

Turning now to FIG. 5, a rear elevation view of the conical cap 12 is presented and shows the open cavity 22, the locking pin 14 with flattened point 34 and rear eyelet 32.

Figure 6:
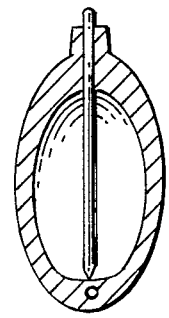
FIG. 6 is a sectional end view of the invention.

In FIG. 6, a cross sectional view from the rear is shown of the conical cap 12 with the locking pin 14 extending through the passage 26 into the open cavity 22. It will be seen that flattened point 34 has a larger lateral dimension than the diameter of passage 26 to prevent locking pin 14 from being lost.

Having described the presently preferred embodiments of the invention, it should be understood that various changes in construction and arrangement will be apparent to those skilled in the art and are fully contemplated herein without departing from the true spirit of the invention. Accordingly, there is covered all alternatives, modifications and equivalents as may be included within the scope and spirit of the invention as defined in the appended claims.

What is claimed is:

1. A fishing rig for use with a bait fish comprising:
    a conical cap configured to appear as a front of the bait fish and fabricated from a dense material forming a close end hollow cavity therein;
    a forward fastening means fixedly attached to an apex of the conical cap, said forward fastening means adapted for connection to a forward leader;
    a rear fastening means fixedly attached to a lower rear edge of the conical cap, said rear fastening means adapted for connection to a rear leader, said rear leader adapted for connection to a fish hook; and
    a locking pin slidably retained within a passage formed within an upper rear surface of the conical cap, said locking pin angled forwardly in a vertical plane to selectively penetrate and retain in a barb-like manner the bait fish inserted into the hollow closed end cavity, said locking pin having a flattened point to prevent its complete withdrawal from the passage.

2. The rig of claim 1 in which the forward fastening means is a forward eyelet.

3. The rig of claim 1 in which the rear fastening means is a rear eyelet.

4. The rig of claim 1 in which the dense material is lead.

5. The lure of claim 1 in which the conical cap is molded with realistically appearing bait fish eyes in an appropriate location.

6. The rig of claim 1 which further comprises the rear leader and hook that together have a length suitable for a point and a barb of the hook to be embedded in the bait fish.

7. The rig of claim 1 which further comprises the forward leader.

8. The rig of claim 1 that when combined with the bait fish has a negative buoyancy sufficient to offset an upward force that tends to cause the rig to surface when towed by a surface vessel moving at trolling speed.

9. The rig of claim 1 that includes a conical cap configured and sized to accept a front of a bait fish that is a ballyhoo with its bill broken off.

10. A method of combining a bait fish with a fishing rig having a conical cap forming therein a closed end hollow cavity and using a locking pin to retain a front of the bait fish, said conical cap having a rear leader and hook of appropriate length attached to the conical cap, comprising the steps of:
    inserting the front of the bait fish into the hollow cavity of the conical cap;
    sliding the locking pin into the bait fish to retain same in the hollow cavity; and
    embedding a point and a barb of the hook into the bait fish.

11. The method of claim 10, when used with a ballyhoo as the bait fish, further comprising the step of breaking off a bill of the ballyhoo prior to inserting the front of the ballyhoo into the hollow cavity of the conical cap.

* * * * *